United States Patent [19]
Sakakibara et al.

[11] Patent Number: 5,479,214
[45] Date of Patent: Dec. 26, 1995

[54] AUTOMATIC RECEIVING CHANNEL SETTING METHOD OF A RECEIVER

[75] Inventors: Shigeto Sakakibara; Kazumi Notomi; Yoshihiro Yamanishi, all of Daito, Japan

[73] Assignee: Funai Electric Co., Ltd., Daito, Japan

[21] Appl. No.: 269,055

[22] Filed: Jun. 29, 1994

[30] Foreign Application Priority Data

Jun. 30, 1993 [JP] Japan .................................. 5-183345
Sep. 9, 1993 [JP] Japan .................................. 5-247296

[51] Int. Cl.6 .................................................. H04N 5/46
[52] U.S. Cl. ........................... 348/558; 348/731; 348/906; 455/188.1
[58] Field of Search ............................ 348/731, 460, 348/906, 553–555, 558; 455/188.1; H04N 5/46

[56] References Cited

U.S. PATENT DOCUMENTS

| | | | |
|---|---|---|---|
| 4,405,946 | 9/1983 | Knight | 348/559 X |
| 4,637,779 | 1/1987 | Greenberg | 348/906 X |
| 4,776,038 | 10/1988 | Testin et al. | |
| 4,805,020 | 2/1989 | Greenberg | 348/460 |
| 5,087,977 | 2/1992 | Suizu | 348/732 |
| 5,193,005 | 3/1993 | Tomita | 348/732 X |

FOREIGN PATENT DOCUMENTS 1776458 7/1993 Japan.

*Primary Examiner*—Victor R. Kostak
*Attorney, Agent, or Firm*—Lackenbach Siegel Marzullo Aronson & Greenspan

[57] ABSTRACT

An automatic receiving channel setting method of the receiver having a receivable signal strength, judges whether or not the detected channel is included within the frequency zone allotted only to the CATV, sets the receiving mode, and searches and memorizes the channel according to the allotted channel plan of the CATV or sets the receiving mode of the receiver to the TV receiving mode of the ground wave and searches and memorizes the channel according to the allotted channel plan of the TV broadcast of the ground wave.

2 Claims, 5 Drawing Sheets

FIG. 4

TABLE OF THE ALLOTTED FREQUENCY OF THE TV BROADCAST OF THE GROUND WAVE AND FREQUENCY OF THE CATV BROADCAST

| CHNL IND | TV fp (MHz) | CATV fp (MHz) | CHNL IND | TV fp (MHz) | CATV fp (MHz) | CHNL IND | TV fp (MHz) | CATV fp (MHz) |
|---|---|---|---|---|---|---|---|---|
| 1 |  | 73.25 | 51 | 693.25 | 385.25 | 100 |  | 649.25 |
| 2 | 55.25 | 55.25 | 52 | 699.25 | 391.25 | 101 |  | 655.25 |
| 3 | 61.25 | 61.25 | 53 | 705.25 | 397.25 | 102 |  | 661.25 |
| 4 | 67.25 | 67.25 | 54 | 711.25 | 403.25 | 103 |  | 667.25 |
| 5 | 77.25 | 77.25 | 55 | 717.25 | 409.25 | 104 |  | 673.25 |
| 6 | 83.25 | 83.25 | 56 | 723.25 | 415.25 | 105 |  | 679.25 |
| 7 | 175.25 | 175.25 | 57 | 729.25 | 421.25 | 106 |  | 685.25 |
| 8 | 181.25 | 181.25 | 58 | 735.25 | 427.25 | 107 |  | 691.25 |
| 9 | 187.25 | 187.25 | 59 | 741.25 | 433.25 | 108 |  | 697.25 |
| 10 | 193.25 | 193.25 | 60 | 747.25 | 439.25 | 109 |  | 703.25 |
| 11 | 199.25 | 199.25 | 61 | 753.25 | 445.25 | 110 |  | 709.25 |
| 12 | 205.25 | 205.25 | 62 | 759.25 | 451.25 | 111 |  | 715.25 |
| 13 | 211.25 | 211.25 | 63 | 765.25 | 457.25 | 112 |  | 721.25 |
| 14 | 471.25 | 121.25 | 64 | 771.25 | 463.25 | 113 |  | 727.25 |
| 15 | 477.25 | 127.25 | 65 | 777.25 | 469.25 | 114 |  | 733.25 |
| 16 | 483.25 | 133.25 | 66 | 783.25 | 475.25 | 115 |  | 739.25 |
| 17 | 489.25 | 139.25 | 67 | 789.25 | 481.25 | 116 |  | 745.25 |
| 18 | 495.25 | 145.25 | 68 | 795.25 | 487.25 | 117 |  | 751.25 |
| 19 | 501.25 | 151.25 | 69 | 801.25 | 493.25 | 118 |  | 757.25 |
| 20 | 507.25 | 157.25 | 70 |  | 499.25 | 119 |  | 763.25 |
| 21 | 513.25 | 163.25 | 71 |  | 505.25 | 120 |  | 769.25 |
| 22 | 519.25 | 169.25 | 72 |  | 511.25 | 121 |  | 775.25 |
| 23 | 525.25 | 217.25 | 73 |  | 517.25 | 122 |  | 781.25 |
| 24 | 531.25 | 223.25 | 74 |  | 523.25 | 123 |  | 787.25 |
| 25 | 537.25 | 229.25 | 75 |  | 529.25 | 124 |  | 793.25 |
| 26 | 543.25 | 235.25 | 76 |  | 535.25 | 125 |  | 799.25 |
| 27 | 549.25 | 241.25 | 77 |  | 541.25 |  |  |  |
| 28 | 555.25 | 247.25 | 78 |  | 547.25 |  |  |  |
| 29 | 561.25 | 253.25 | 79 |  | 553.25 |  |  |  |
| 30 | 567.25 | 259.25 | 80 |  | 559.25 |  |  |  |
| 31 | 573.25 | 269.25 | 81 |  | 565.25 |  |  |  |
| 32 | 579.25 | 271.25 | 82 |  | 571.25 |  |  |  |
| 33 | 585.25 | 277.25 | 83 |  | 577.25 |  |  |  |
| 34 | 591.25 | 283.25 | 84 |  | 583.25 |  |  |  |
| 35 | 597.25 | 289.25 | 85 |  | 589.25 |  |  |  |
| 36 | 603.25 | 295.25 | 86 |  | 595.25 |  |  |  |
| 37 | 609.25 | 301.25 | 87 |  | 601.25 |  |  |  |
| 38 | 615.25 | 307.25 | 88 |  | 607.25 |  |  |  |
| 39 | 621.25 | 313.25 | 89 |  | 613.25 |  |  |  |
| 40 | 627.25 | 319.25 | 90 |  | 619.25 |  |  |  |
| 41 | 633.25 | 325.25 | 91 |  | 625.25 |  |  |  |
| 42 | 639.25 | 331.25 | 92 |  | 631.25 |  |  |  |
| 43 | 645.25 | 337.25 | 93 |  | 637.25 |  |  |  |
| 44 | 651.25 | 343.25 | 94 |  | 643.25 |  |  |  |
| 45 | 657.25 | 349.25 | 95 |  | 91.25 |  |  |  |
| 46 | 663.25 | 355.25 | 96 |  | 97.25 |  |  |  |
| 47 | 669.25 | 361.25 | 97 |  | 103.25 |  |  |  |
| 48 | 675.25 | 367.25 | 98 |  | 109.25 |  |  |  |
| 49 | 681.25 | 373.25 | 99 |  | 115.25 |  |  |  |
| 50 | 687.25 | 379.25 | 00 |  | - |  |  |  |

AUTOMATIC RECEIVING CHANNEL SETTING METHOD OF A RECEIVER

BACKGROUND OF THE INVENTION

This invention relates to an automatic setting method of a receiving channel of a receiver wherein a television (TV) broadcast through ground waves and a CATV (cable television) broadcast through wire search channels according to each channel plan to store in a memory device.

Heretofore, since channel plans for TV broadcast through ground waves and CATV broadcasts are different in both transmission passages (in the case of ground waves the broadcast is space, while CATV uses an exclusive cable), each channel in the same frequency zone was allotted to overlap. Further, with CATV broadcasts, many channels are allotted to frequency zones which are not used for ground wave broadcasts.

FIG. 5 is a block drawing which shows a setting method of receiving channels of a traditional receiver. In the Figure, numeral 1 is a television antenna for receiving a television broadcast wave of a ground wave, 2 is a distributor, 3 is a cable connecting terminal and 4 is a receiver input terminal. The numeral 7 is a signal processing portion where the frequency conversion is conducted against the received signal, 8 is a channel selecting portion where a desired signal of the channel frequency from the received signal is selected, and 10 is an intermediate frequency amplification portion which amplifies a signal converted into the intermediate frequency zone in the signal processing portion 7.

The numeral 11 is a slide switch for setting a receiving mode of the receiver itself to either the television broadcast through ground wave or CATV. When this is set in a mode to receive the ground wave TV, a slide switch is moved to the upper side, while if set to a CATV receiving mode, said switch is moved to the lower side.

Thus, in the receiving channel setting method of the traditional receiver, when the channel of TV broadcast of the ground wave is set, a user of the receiver operates the switch 11 in advance, thereby setting the receiving mode of the receiver to the receiving mode of the TV broadcast of the ground wave. As a result, in the channel selection portion 8 of the receiver, the channel is searched to be set to store according to the channel plan of the TV broadcast of the ground wave previously memorized. Further, when receiving CATV broadcasts, the switch 11 is operated to set the receiving mode of the receiver to the receiving mode of the CATV broadcast, whereby the channel is searched to be memorized according to the channel plan of the CATV broadcast previously memorized.

Since the automatic setting method of the receiving channel in the traditional receiver is composed as above, when the user intends to set the above channel, it is necessary to select the TV broadcast of the ground wave or the CATV broadcast beforehand. It is therefore not easy to operate for a user unaccustomed to the operation of the receiver.

This invention is performed to solve such problems, and its object is to provide an automatic receiving channel setting method of a receiver wherein the receiver searches a part of the receiving channel automatically thereby judging whether it is TV broadcast of the ground wave or CATV, and remaining channel searches and memorizes according to said channel plan.

BRIEF DESCRIPTION OF THE INVENTION

An automatic receiving channel setting method of a receiver according to a first embodiment as a means for solving the above problems is adapted to;

detect a channel having receivable signal strength and, if the detected channel is judged to be included within a frequency zone allotted only to CATV, the receiving mode searches the channel to store according to the channel plan set in the CATV receiving mode; while if there exists no channel which can be detected in the frequency zone allotted only to the CATV, the receiving mode of the receiver is set to the receiving mode of the ground wave, searching the channel to store according to the channel plan allotted to TV broadcast of the ground wave.

Furthermore, the automatic receiving channel setting method of the receiver according to the second embodiment detects the channel having a receivable signal strength, and judges whether or not the detected channel is included in the frequency zone allotted only to the CATV, and if a plurality of said channels are included in the above frequency zone, the receiving mode of the receiver is set to the CATV receiving mode to search the channel and store it according to the channel plan allotted to the CATV; which if there is only one channel which can be detected in the frequency zone allotted only to the CATV, the receiving mode of the receiver is set to the TV receiving mode of the ground wave to search the channel to store according to the channel plan allotted to the TV broadcast of the ground wave.

In the automatic receiving channel setting method of the receiver in the first invention, since the frequency zone used in the TV broadcast of the ground wave and the frequency zone used in the CATV broadcast has a dual zone, it is judged whether or not there exists a frequency zone used in the CATV broadcast, but not used in the TV broadcast of the ground wave, and a receivable channel having a sufficient signal strength. When there exists the above receivable channel, after a determination that a cable for CATV is connected to the receiver and a signal through the CATV broadcast is transferred, the receiving mode is set to a CATV broadcast receiving mode, and the channel search is performed based upon the channel plan of the CATV broadcast previously memorized, whereby the channel is stored. When the receivable channel having a sufficient signal strength zone, after a determination that the cable for CATV is not connected to the receiver, but the TV antenna which receives the TV broadcast of the ground wave is connected, the channel search is performed based upon the channel plan of the TV broadcast of the ground wave previously memorized whereby the channel is set to store.

In the automatic receiving channel setting method of the receiver in the second embodiment, since there exists a dual zone where the frequency zone used for the TV broadcast of the ground wave and the frequency zone used for CATV broadcast overlap each other, a determination of whether or not there exists a plurality of receivable channels having sufficient signal strength used for the CATV broadcast, but not used for the TV broadcast of the ground wave within the frequency zone, is made. When there exists a plurality of such receivable channels, a receiving mode is set as a receiving mode for CATV broadcast according to a determination that the cable for CATV is connected to the receiver and a signal of the CATV broadcast is transferred, and the channel search is performed based upon the channel plan for the CATV broadcast previously memorized whereby the channel is set to store. Further, when no or only one receivable channel having a sufficient signal strength can be detected in the above frequency zone, it is determined that the cable for CATV is not connected to the receiver, but the TV antenna for receiving the TV broadcast of the ground wave is connected. Accordingly, the channel search is performed based upon the channel plan for the TV broadcast of the ground wave previously memorized whereby the channel is set to store.

In the second embodiment, the reason why it is not determined to be CATV where there is only one detected channel is that since the frequency zones for information of a moving body and other objects are allotted overlappingly, these signals may also be received. However, since such a possibility is low, a plurality of channels, even two channels (the lowest) is checked regarding the possibility of receiving.

BRIEF DESCRIPTION OF THE DRAWINGS

FIG. 4 is a table of the allotted frequency of the TV broadcast of the ground wave and the frequency of the CATV broadcast in the United States.

DETAILED DESCRIPTION OF THE INVENTION

Figure 1:
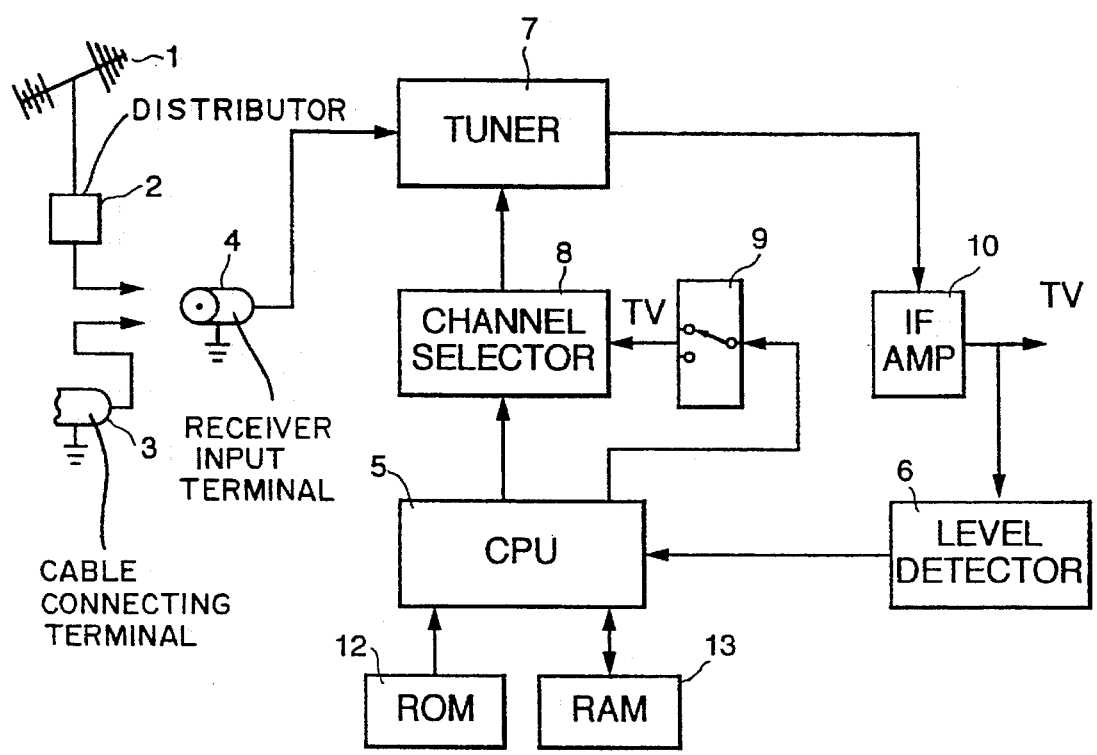
FIG. 1 is a block drawing which shows the structure of the automatic receiving channel setting method of the receiver according to an embodiment of this invention.

The embodiment of this invention will be described as follows with reference to the drawings. FIG. 1 is a block drawing which shows a structure of the automatic receiving channel setting method of the receiver in the embodiment of FIG. 1. In the Figure, 1 is a TV antenna for receiving the V broadcast of the ground wave, 2 is a distributor, 3 is a connecting terminal for CATV cable, and 4 is a receiver input terminal. The numeral 7 is a signal processing portion which converts the frequency to the receiving signal, 8 is a channel selection portion which selects a desired signal of the channel frequency from the receiving signal, 9 is a switching circuit which switches the receiving mode of the receiver to either the receiving mode of the TV broadcast of the ground wave or the receiving mode of the CATV broadcast, 10 is an intermediate frequency amplification portion where the signal converted to the intermediate frequency zone in the signal processing portion 7 is amplified.

The numeral 6 is a level detector which detects an output level of the intermediate frequency amplification portion 10, 12 is a ROM (read only memory) which memorizes the channel plans of both TV broadcast of the ground wave and the CATV broadcast, 13 is a RAM (random access memory) which memorizes the results of the channel selection, 5 is a CPU (central processing unit) which controls the channel selection portion 8 and the switching circuit 9 based upon the information from the ROM 12.

The operation of the hardware is described next. For convenience of description, it is assumed that an exclusive cable of the CATV is connected to the input terminal 4. First, the CPU 5 controls the channel selection portion 8 and the switching circuit 9 according to the diagram and the channel plan memorized in ROM. This output is given to the signal processing portion 7, said processing portion 7 determining the receiving frequency. Then, the CATV signals input to the input terminal 4 of the receivers are selectively received at the signal processing portion 7, then amplified at the intermediate frequency amplification portion 10 and thereafter guided to an image circuit of the TV receiver. A part of the output of the intermediate frequency amplification portion 10 is branched, transferred to the level detector 6 for detecting the level and allotted to return to the CPU 5 after A/D conversion.

In short, the strength information of the receiving signal of the CATV signal selectively received at the signal processing portion 7 is finally returned to the CPU 5.

Figure 2:
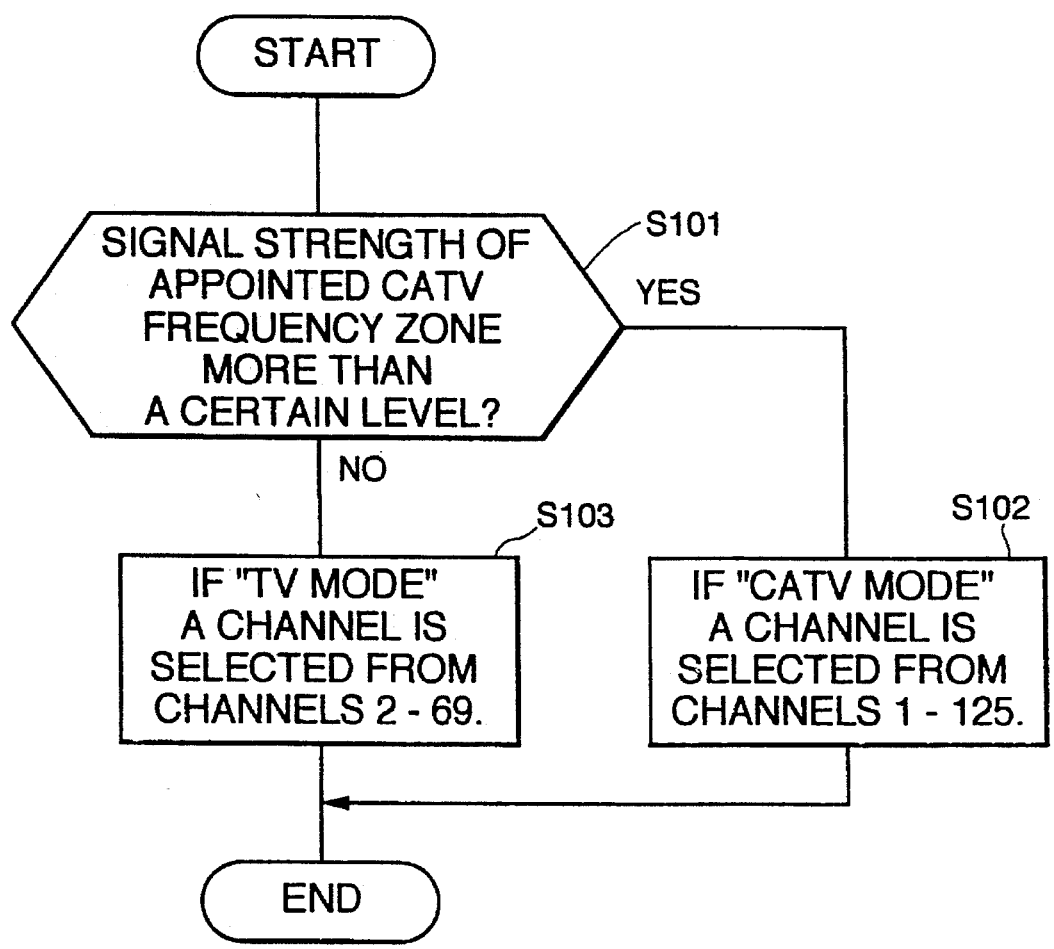
FIG. 2 is a flow chart which explains the operation of the automatic setting method of the receiving channel according to an embodiment of the first invention.
Figure 3:
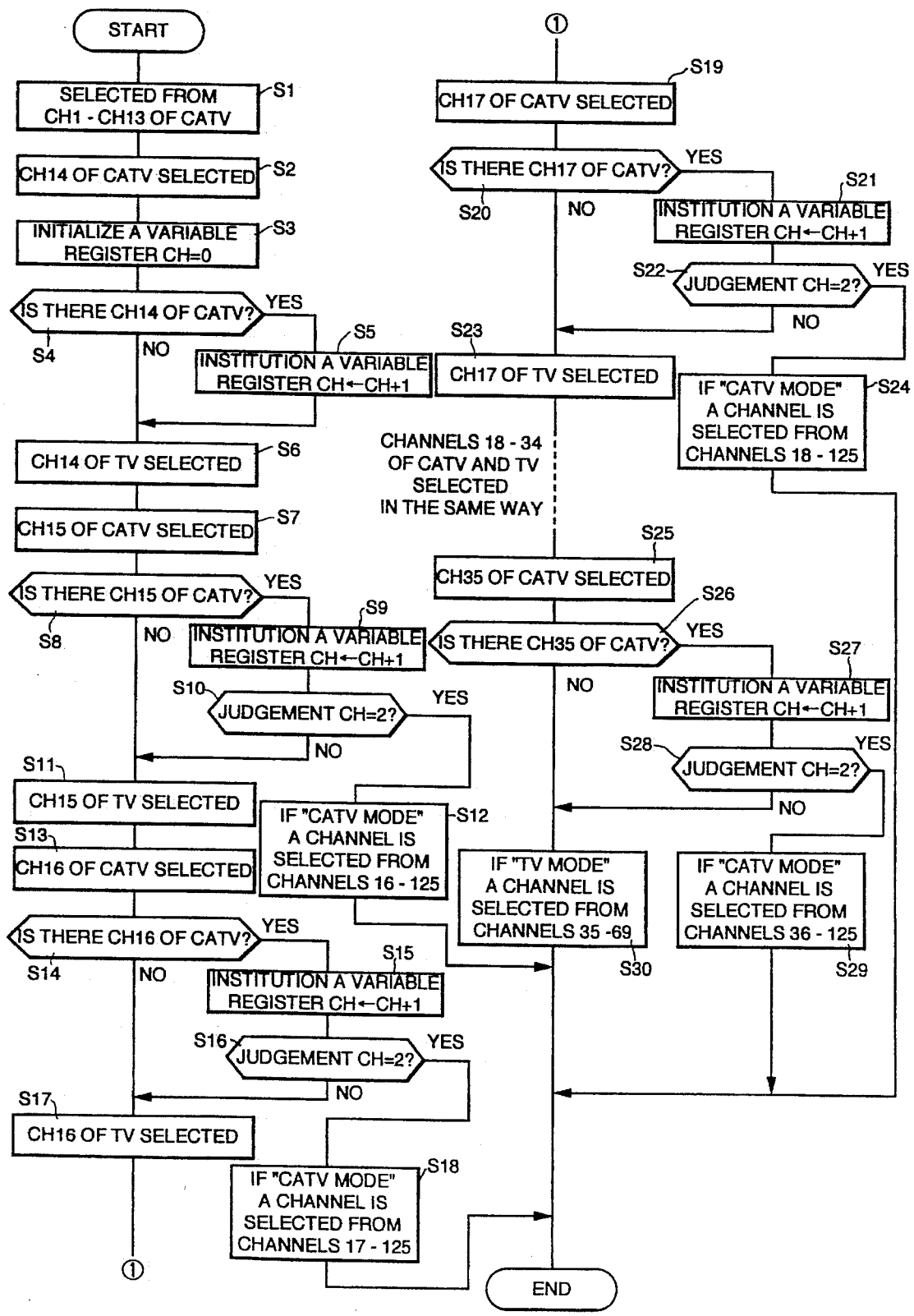
FIG. 3 is a flow chart which explains the operation of the automatic receiving channel setting method of the receiver according to the second invention.
Figure 5:
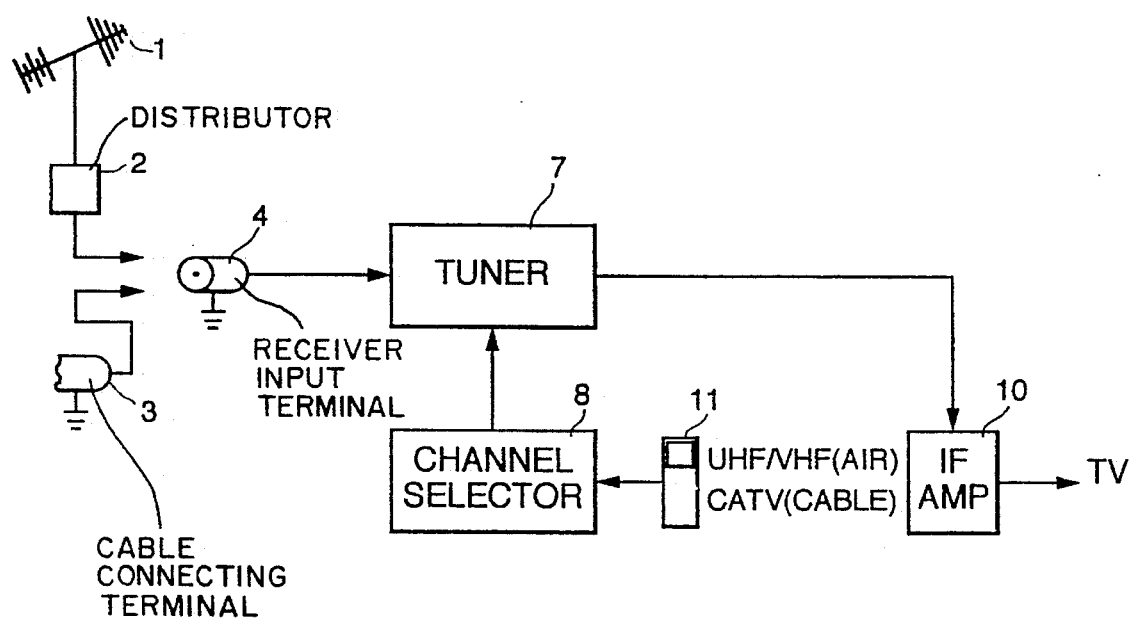
FIG. 5 is a block drawing which shows the structure of the automatic setting method of the receiving channel of the traditional receiver.

The details of operation are next described. FIG. 2 and FIG. 3 are flow charts for explaining the operation. FIG. 4 is an allotted table of the channel of TV/CATV of the ground wave in the United States. According to this allotted table, the channel plan of the CATV is allotted its frequency to almost over the frequency zone. On the other hand, the channel plan of the TV broadcast of the ground wave has a portion where an interval between channels is expanded along the way, and the number of channels is also small.

The embodiment of the first invention will be described with reference to FIG. 2.

First, a channel covering a frequency band as assigned only to the CATV broadcast is selected. This channel indicates any channels where there exist CATV broadcasts with no relation to the receiving area. Its signal strength is then judged to determine whether or not it is more than a certain level which shows a possibility of receiving. If this result is more than the above level, the signal level is diverged to "Yes", and if less than the level, it is diverged to "No" (Step S101).

In this case, "channel selection" (hereinafter referred to as simply "selection" or "select") means:

although the CPU 5 controls the switching circuit 9 and the channel selection portion in every channel, determines the receiving frequency, receives the signal selectively at the signal processing portions 7 based upon the above information, and detects the signal strength by level detector 6 after amplification at the intermediate frequency amplification portion 10, when its signal strength is more than a certain level and is receivable the CPU determines that "a broadcasting signal is received", thereby memorizing the existence of its channel to the RAM 13.

When step S101 is "YES", it is the "CATV mode", and a channel is selected from channels 1–125 of the CATV afterward (step S102).

When step S101 is "NO", it is the "broadcasting mode of the ground wave" and a channel is selected from channels 2–69 of the ground wave broadcast (step S103).

The embodiment of the second invention will be described with reference to the flow chart in FIG. 3.

First, a channel is selected from channels 1–13 (step S1).

Further, from channels 2–13 are the same frequency allotment as the TV broadcast of the ground wave and the CATV broadcast.

Channel 14 of the CATV is selected (step S2).

A variable register CH which memorizes the number of CATV broadcast stations is instituted 0 therein. That is initialized (step 3).

As a result of the selection of channel 14 of the CATV, if there exists a receivable channel, the flow chart 4 diverges to "YES", but, if none exists it diverges to "NO" (step S4).

If "YES", the variable CH increases its value by 1 (step S5).

Then, channel 14 of the ground wave broadcast is selected (step S6).

This is due to the fact that both channels are to be selected because it is not clear that either service of the ground wave broadcast or the CATV is received in this step.

The channel 15 of the CATV is selected (step S7).

As a result of the selection of channel 15 in CATV, if there exists a reversible channel, this step diverges to "YES", while if one does not exist, it diverges to "NO" (step S8).

If "YES", the value of variable CH increases 1 (step S9). Thereafter, as a result of a determination of variable CH value, if it is 2 (step S10), it further advances to "YES" and is determined to be a CATV mode because the CATV channel has more than two receivable channels whereby CATV channels 16–125 are selected afterward (step S12).

If "NO" in step S8, channel 15 of the ground wave broadcast is selected (step S11). In this step, since it is not clear whether or not either of the ground wave broadcast or CATV received the service, both channels are selected.

Such methods are repeated from channels 16–35, increasing by a channel after S13. The receiving mode is determined to be CATV mode at the step when the variable CH value becomes 2 along the way, and thereafter, only the CATV channel is selected until channel 125 (from step S13 to step S29).

If "NO" at step S26, the mode is judged to be the ground wave broadcast mode assuming that there is no receivable channel more than 2 channels in the CATV frequency zone, and thereafter only the ground wave broadcast channel is selected to channel 69 (step S30).

Although selective working of the channel selection is completed according to the above description, when the channel is finally judged to be the ground wave broadcast mode, information memorized as CATV channels are cancelled, and vice versa.

According to the present invention, at first, a channel having a receivable signal strength is detected, then identified as to whether it is included in the band assigned only to CATV. If the channel is included, the receiving mode of a receiver is set to the CATV receiving mode. If not included, the mode is set, at first, to the surface wave television receiving mode, followed by searching, memorizing and setting in compliance with the channel-assigning plan.

Owing to the above compositions and functions, the operator does not have to set the receiving mode.

Further, in the second embodiment, either the CATV mode, or the surface wave mode shall, at first, be searched by using the two modes alternately. After searching, if at least two channels are identified within the frequency band assigned only to CATV the rest of the channels shall be searched based on the CATV mode. Under this system, erroneous CATV settings occur less often than in the system based on one channel only, resulting in promotion of reliability in searching. Moreover, even if only one channel is identified, channel searching under surface wave mode available.

Furthermore, since discrimination of CATV mode from surface wave television mode functions during the channel searching, the routine to operate such discrimination is not required to be prepared.

What is claimed is:

1. Method of automatically setting the selection mode of a receiver for receiving broadcast T.V. or CATV, comprising the steps of detecting a channel having a receivable signal strength; determining if the detected channel is included within a frequency zone allotted only to CATV; memorizing the CATV channel and setting the receiver according to an allotted CATV channel plan; memorizing and setting the receiving mode of the receiver to receive T.V. channels only when no channel can be detected within a frequency zone allotted only to CATV according to an allotted channel plan of the broadcast T.V.

2. Method of automatically setting the selection mode of a receiver for receiving broadcast T.V. or CATV, comprising the steps of detecting a plurality of channels having a receivable signal strength; determining if any of said plurality of detected channels is included within a frequency zone allotted only to CATV; memorizing and setting the receiving mode of the receiver to the CATV receiving mode when a predetermined number of channels are included within the frequency zone allotted only to CATV; and memorizing and setting the receiving mode to the T.V. receiving mode in accordance to the T.V. broadcast channel plan only when the number of channels which can be detected within the frequency zone allotted to CATV is 1.

* * * * *